United States Patent
Kovash et al.

(10) Patent No.: US 9,970,658 B2
(45) Date of Patent: May 15, 2018

(54) PRESSURE RELIEF VALVE WITH ROTATING DAMPER

(71) Applicant: Steffes Corporation, Dickinson, ND (US)

(72) Inventors: Dean A. Kovash, Dickinson, ND (US); Todd C. Mayer, Dickinson, ND (US); Kent J. Kudrna, Dickinson, ND (US)

(73) Assignee: Steffes Corporation, Dickinson, ND (US)

( * ) Notice: Subject to any disclaimer, the term of this patent is extended or adjusted under 35 U.S.C. 154(b) by 415 days.

(21) Appl. No.: 14/701,009

(22) Filed: Apr. 30, 2015

(65) Prior Publication Data

US 2015/0233576 A1    Aug. 20, 2015

Related U.S. Application Data

(63) Continuation-in-part of application No. 14/409,762, filed as application No. PCT/US2014/011780 on Jan. 16, 2014.

(Continued)

(51) Int. Cl.
*F23N 1/02* (2006.01)
*F23G 7/08* (2006.01)
(Continued)

(52) U.S. Cl.
CPC .......... *F23G 7/085* (2013.01); *F16K 17/0433* (2013.01); *F16K 17/12* (2013.01);
(Continued)

(58) Field of Classification Search
CPC .. F23N 2035/18; F23N 1/007; F23N 2035/16; F23N 2035/24; F23N 1/005;
(Continued)

(56) References Cited

U.S. PATENT DOCUMENTS

| 3,547,567 A | 12/1970 | Turpin |
| 3,711,236 A | 1/1973 | Kinsella et al. |

(Continued)

FOREIGN PATENT DOCUMENTS

| CN | 2318516 Y | 5/1999 |
| EP | 0026067 A2 | 4/1981 |
| WO | 2014/113529 A1 | 7/2014 |

OTHER PUBLICATIONS

First Office Action from Chinese Application No. 201480005227.3, dated Jul. 4, 2016.

(Continued)

*Primary Examiner* — Jason Lau
(74) *Attorney, Agent, or Firm* — Brian D. Kaul; Westman, Champlin & Koehler, P.A.

(57) ABSTRACT

A combustible gas burner includes gas flow conduit or a housing having an outlet and a pressure relief valve. The pressure relief valve includes a valve seat at the outlet, a valve body and a valve body rotator. The valve body is configured to engage the valve seat and move along an axis relative to the valve seat in response to a pressure at the outlet. The valve body rotator is configured to rotate the valve body about the axis in response to movement of the valve body along the axis relative to the valve seat.

20 Claims, 11 Drawing Sheets

Related U.S. Application Data

(60) Provisional application No. 61/754,219, filed on Jan. 18, 2013.

(51) Int. Cl.
| | |
|---|---|
| *F16L 55/04* | (2006.01) |
| *F16K 17/04* | (2006.01) |
| *F16K 17/12* | (2006.01) |
| *F16K 29/00* | (2006.01) |
| *F23N 5/24* | (2006.01) |

(52) U.S. Cl.
CPC .............. *F16K 29/00* (2013.01); *F16L 55/04* (2013.01); *F23G 7/08* (2013.01); *F23N 5/247* (2013.01); *F23N 2035/24* (2013.01)

(58) Field of Classification Search
CPC .. F23N 2035/20; F23N 1/002; F23N 2037/08; F23N 2041/02; F23N 5/10; F23N 5/102; F23N 5/242; F23N 5/245; F23N 1/022; F23N 1/00; F16K 31/0613; F16K 11/07; F16K 11/0708; F16K 15/06; F16K 15/148; F16K 31/126; F16K 7/17; F16K 17/14; F16K 17/36; F16K 37/0075; F16K 3/24; F16K 3/246; F16K 3/267; F16K 3/32; F16K 3/34; F16K 15/026; F16K 17/003; F16K 17/0433; F16K 24/04; F16K 25/00; F16K 31/122; F16K 37/0008; Y10T 16/61; Y10T 74/19251; Y10T 137/2278; Y10T 74/19279; F02D 13/0276; F02D 41/3836; F01N 13/0097; F01N 3/035; F01N 3/2033; F01N 11/00; F01N 13/017; F01N 2240/02; F01N 2240/06; F01N 2330/06; F01N 2470/30; F01N 2510/06; F01N 2550/10; F01N 2550/12; F01N 2560/02; F23G 7/085
See application file for complete search history.

(56) References Cited

U.S. PATENT DOCUMENTS

| | | |
|---|---|---|
| 4,021,189 A | 5/1977 | Swann et al. |
| 4,099,908 A | 7/1978 | Beckmann et al. |
| 2012/0255536 A1* | 10/2012 | Deng ...................... F23N 1/007 126/58 |
| 2015/0153042 A1 | 6/2015 | Kovash et al. |

OTHER PUBLICATIONS

Examiner's First Report from Australian Patent Application No. 2015202585, dated Nov. 4, 2018.
Communication pursuant to Rules 161(1) and 162 EPC from European Patent Application No. 14702709.8, dated Aug. 28, 2015.
International Search Report and Written Opinion of PCT/US2014/011780, dated May 13, 2014.
Non-Final Office Action from corresponding U.S. Appl. No. 14/409,762, dated Sep. 13, 2017.
Final Office Action from corresponding U.S. Appl. No. 14/409,762, dated Oct. 27, 2017.

* cited by examiner

PRESSURE RELIEF VALVE WITH ROTATING DAMPER

CROSS-REFERENCE TO RELATED APPLICATIONS

This application is a continuation in part of U.S. application Ser. No. 14/409,762, filed Dec. 19, 2014, which is a Section 371 National Stage Application of International Application No. PCT/US2014/011780, filed Jan. 16, 2014 and published as WO 2014/113529 on Jul. 24, 2014, in English, which claims the benefit of U.S. Provisional Application Ser. No. 61/754,219, filed Jan. 18, 2013 under 35 U.S.C. § 119(e). Each of the above-referenced applications are incorporated herein by reference in their entirety.

BACKGROUND

There are many occasions in which waste gasses are disposed of using a flare stack burner. Such burners having conventionally utilized a flare tip comprising a valve body, such as a Coanda body, that is either free floating or spring-loaded against an outlet or valve seat of a gas pipe. Pressurized waste gas lifts the valve body off the valve seat to form a variable opening through which the waste gas is discharged and ignited by a pilot burner to dispose of the waste gas.

The exit velocity of the gas through the variable opening changes in response to the displacement of the valve body off the valve seat. This occurs due to the variable load applied to the valve body by the spring. As pressure increases, the valve body is displaced further from the valve seat.

At low pressures, conventional flare tips are known to produce "chatter." Chatter occurs during a pressure spike when the gas produces enough pressure to lift the valve body off the valve seat, but not enough pressure to maintain the displacement of the valve body from the valve seat. Instead, the valve body repeatedly lifts off the valve seat and then drops back onto the valve set in a rapid manner, causing undesirable chatter noise. Additionally, such chatter can potentially damage to the valve seat.

SUMMARY

Some embodiments of the invention are directed to a combustible gas burner. In some embodiments, the combustible gas burner includes gas flow conduit or a housing having an outlet and a pressure relief valve. The pressure relief valve includes a valve seat at the outlet, a valve body and a valve body rotator. The valve body is configured to engage the valve seat and move along an axis relative to the valve seat in response to a pressure at the outlet to regulate the flow of combustible gas through the outlet. The valve body rotator is configured to rotate the valve body about the axis in response to movement of the valve body along the axis relative to the valve seat. The rotational movement of the valve body can reduce or eliminate chatter.

In some embodiments, the burner comprises a shaft attached to the valve body, one or more bushing supports, each having a fixed position relative to the conduit, and one or more bushings, through which the shaft extends, each bushing supported by one of the bushing supports and configured to maintain the shaft in general alignment with the axis. In some embodiments, the valve body rotator comprises a rod having a first end coupled to the shaft and a second end coupled to one of the bushing supports. In some embodiments, rotation of the valve body and the shaft about the axis is driven using the rod responsive to movement of the valve body along the axis relative to the valve seat in response to pressure changes or gas flow changes at the outlet. In some embodiments, the rod is placed at an angle relative to the axis, and the angle is changed in response to moving the valve body along the axis relative to the valve seat in response to pressure or gas flow changes at the outlet.

In some embodiments of the burner, the valve body engages the valve seat to place the pressure relief valve in a closed mode when the pressure at the outlet is below a threshold pressure. In some embodiments, pressure-driven movement of the valve body along the axis displaces the valve body from the valve seat to place the pressure relief valve in an open mode when the pressure at the outlet is above the threshold pressure. In some embodiments, the combustible gas is discharged through the outlet at a substantially constant velocity when the pressure relief valve is in the open mode. In some embodiments, the valve body rotator is within the conduit. In some embodiments, the valve body rotator is configured to accelerate the rotation of the valve body about the axis in response to fluctuations in the pressure at the outlet. In some embodiments, the valve body rotator is configured to vary an amount of rotation of the valve body per unit length of movement of the valve body along the axis relative to the valve seat based on a distance the valve body is displaced from the valve seat.

In some embodiments, the valve body rotator is configured to vary an amount of rotation of the valve body per unit length of movement of the valve body along the axis relative to the valve seat based on a distance the valve body is displaced from the valve seat. In some embodiments, the valve body rotator is configured to decrease the amount of rotation of the valve body per unit length of movement of the valve body along the axis relative to the valve seat as the distance the valve body is displaced from the valve seat increases. In some embodiments, the valve body rotator is configured to increase the amount of rotation of the valve body per unit length of movement of the valve body along the axis relative to the valve seat as the distance the valve body is displaced from the valve seat decreases.

Some embodiments of the burner comprise a shaft attached to the valve body, one or more bushing supports, and one or more bushings through which the shaft extends. In some embodiments, each bushing support has a fixed position relative to the conduit or housing. Each bushing is supported by one of the bushing supports and is configured to maintain the shaft in general coaxial alignment with the axis. In some embodiments, the burner comprises at least two bushing supports displaced from each other along the axis. In some embodiments, the bushing supports are each attached to the conduit or housing.

Some embodiments of the valve body rotator include a mechanical linkage having a first end that is attached to the gas flow conduit and a second end that is attached to the valve body either directly or through another component. In some embodiments, the mechanical linkage includes a first mechanical joint, a second mechanical joint, and a rod or linkage arm.

In some embodiments, the valve body rotator comprises a rod having a first end coupled to the shaft and a second end coupled to one of the bushing supports. The rod drives rotation of the shaft and the valve body responsive to movement of the valve body along the axis relative to the valve seat. In some embodiments, the rod is displaced at an angle relative to the axis, and the angle changes in response to movement of the valve body along the axis relative to the valve seat.

In some embodiments, the burner includes a pilot burner configured to ignite the combustible gas discharged through the outlet.

Some embodiments of the invention are directed to a pressure relief valve or gas flow regulator comprising a valve body and a valve body rotator. The pressure relief valve may be installed in any suitable conduit or housing to provide pressure relief when the pressure within the conduit or housing exceeds a cracking pressure of the valve. In some embodiments, the valve body is configured to engage a valve seat and move along an axis relative to the valve seat in response to a pressure within the conduit or housing to which the pressure relief valve is mounted. In some embodiments, the valve body rotator is configured to rotate the valve body about the axis in response to movement of the valve body along the axis relative to the valve seat. Displacement of the valve body from the valve seat forms a variable opening through which gas or fluid within the conduit or housing is discharged. Embodiments of the pressure relief valve include those described herein with regard to the combustible gas burner embodiments.

Additional embodiments are directed to a method of regulating a flow of combustible gas through an outlet of conduit or a housing of the burner. In some embodiments, a valve body is moved along an axis relative to a valve seat located at the outlet in response to changes in pressure or the gas flow at the outlet. The valve body is rotated about the axis responsive to the moving of the valve body along the axis relative to the valve seat using a valve body rotator.

In some embodiments, the valve body engages the valve seat when the pressure at the outlet is below a threshold pressure, and the valve body is displaced along the axis from the valve seat when the pressure at the outlet is above the threshold pressure. In some embodiments, combustible gas is discharged through the outlet at a substantially constant velocity when the valve body is displaced from the valve seat and the pressure at the outlet is above the threshold pressure. In some embodiments, the combustible gas discharged through the outlet is ignited using a pilot burner. In some embodiments, an amount of rotation of the valve body per unit length of movement of the valve body along the axis relative to the valve seat is varied based on a distance the valve body is displaced from the valve seat using the valve body rotator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
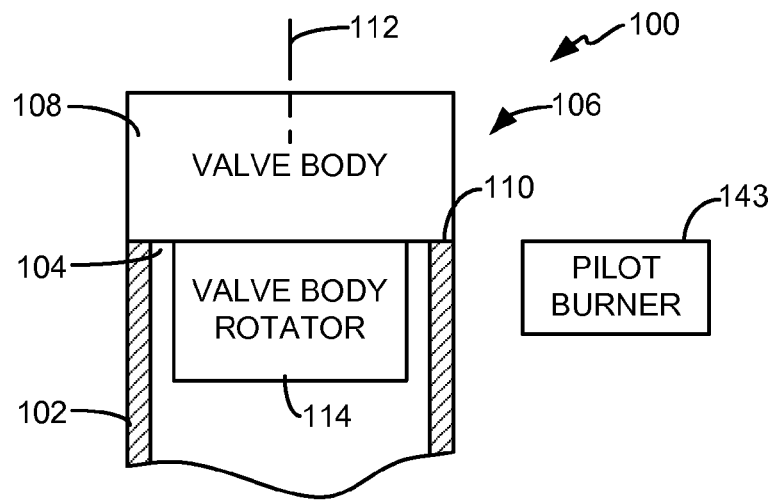
FIGS. 1 and 2 are simplified block diagrams of a combustible gas burner respectively in closed and open modes, in accordance with embodiments of the invention.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

Figure 2:
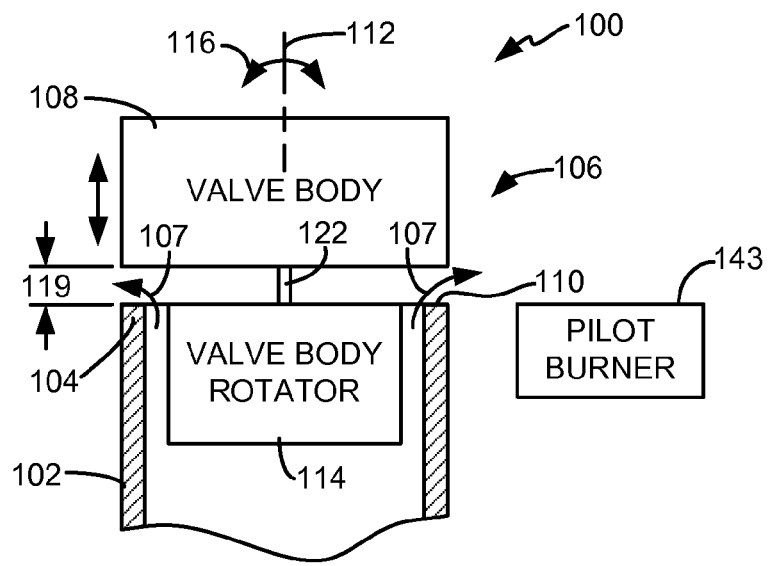
Figure 3:
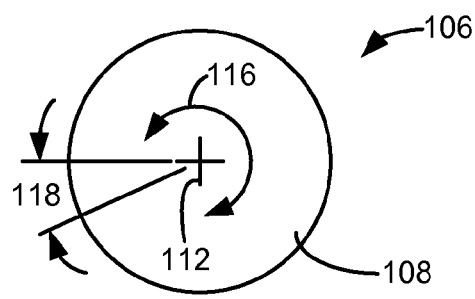
FIG. 3 is a simplified top view of a valve body rotator of a pressure relief valve of the combustible gas burners of FIGS. 1 and 2.

FIGS. 1-3 illustrate embodiments of a combustible burner 100, such as a flare stack burner, formed in accordance with one or more embodiments of the invention. FIGS. 1 and 2 are simplified block diagrams of a combustible gas burner 100 respectively in closed and open modes, in accordance with embodiments of the invention. FIG. 3 is a simplified top view of a valve body rotator of a pressure relief valve of the combustible gas burners of FIGS. 1 and 2.

In some embodiments, the burner 100 includes gas flow conduit or a housing 102 including an outlet 104, and a pressure relief valve or gas flow regulator (hereinafter "pressure relief valve") 106. The pressure relief valve 106 is generally configured to possibly seal and provide a variable opening at the outlet 104 of the gas flow conduit 102 to regulate the flow of combustible gas, which is represented by arrows 107 (FIG. 2), through the outlet 104.

In some embodiments, the pressure relief valve 106 includes a valve body 108 that engages a valve seat 110 at the outlet 104 when in a closed mode, as shown in FIG. 1 to form a seal at the valve seat 110 to prevent or at least restrict the flow of gas through the outlet 104. In a flare stack burner, the valve body 108 may be referred to as a "flare tip." The valve body 108 is configured to move along a main axis 112 relative to the gas flow conduit 102 and the valve seat 110 in response to pressurized gas within the conduit 102, or at the outlet 104 to place the pressure relief valve 106 in an open mode, in which the valve body 108 is displaced from the valve seat 110, as illustrated in FIG. 2. This forms an opening, such an annular opening, between the valve body 108 and the valve seat 110 that varies in response to the pressure at the outlet 104.

In some embodiments, the pressure relief valve 106 comprises a valve body rotator 114 that translates the pressure-driven movement of the valve body 108 along the axis 112 into a rotation of the valve body 108, or other mass coupled to the valve body 108, about the axis 112, as indicated by arrow 116 in FIGS. 2 and 3. In other words, when the pressurized gas flow within the conduit 102 exceeds a threshold pressure (i.e., cracking pressure) on the valve body 108, the valve body 108 rotates about the axis 112 as it moves along the axis 112 away from the valve seat 110.

The mass of the valve body 108 controls the cracking pressure required to transition the valve body 108 from the closed mode (FIG. 1) to the open mode (FIG. 2). The rotational inertia of the valve body 108 operates as a damper that dampens the movement of the valve body 108 along the axis 112 responsive to changes in the pressure of the gas flow. This rotational dampening prevents the valve body 108 from rapidly moving along the axis 112 in response to pressure changes in the gas flow when the valve body 108 is engaging or is in close proximity to the valve seat 110. This rotational dampening of the valve body 108 eliminates or reduces the chatter that could otherwise occur if a conventional spring-loaded flare tip were used.

For instance, when the pressure of the gas within the conduit 102 reaches the cracking pressure required to displace the valve body 108 off the valve seat 110, the valve body rotator 114 causes the valve body 108, or other attached mass, to rotate about the axis 112 as the valve body 108 rises off the valve seat 110 and the gas flow 107 is discharged through an opening between the valve body 108 and the valve seat 110 at the outlet 104. Fluctuations in the pressure of the gas flow produce an acceleration to the rotation of the valve body 108 as the valve body 108 moves further from the valve seat 110 during a pressure increase, or toward the valve seat 110 during a pressure decrease. This rotation of the valve body 108 along with the relatively high rotational inertia of the valve body 108 relative to the foreseen gas flow pressures, prevents the valve body 108 from producing the undesired chatter against the valve seat 110 at gas flow pressures around the cracking pressure of the pressure relief valve 106.

In one exemplary embodiment, the valve body 108 is angularly displaced about the axis 112 at an angle 118 (FIG. 3) of approximately 5 degrees as the valve body 108 lifts off the valve seat 110 a distance 119 (FIG. 2) of approximately 0.030 inches. In some embodiments, the amount of rotation 118 of the valve body per unit length of movement along the axis 112 varies based on the distance 119 the valve body 108 is displaced from the valve seat 110. In some embodiments, the amount of rotation of the valve body 108 about the axis 112 per unit length of movement along the axis 112 is greater when the valve body 108 is in close proximity to the valve seat 110, than when the valve body 108 is displaced from the valve seat 110. This allows for a greater translation of the pressure on the valve body 108 to rotation of the valve body 108 about the axis 112 when the valve body 108 is in close proximity to the valve seat 110 in order to have the maximum effect on the reduction of chatter between the valve body 108 and the valve seat 110. As the valve body 108 moves away from the valve seat 110 along the axis 112, the amount of rotation of the valve body 108 in response to the movement along the axis 112 is reduced and the valve body 108 operates more like a free floating valve body, in some embodiments.

Figure 4:
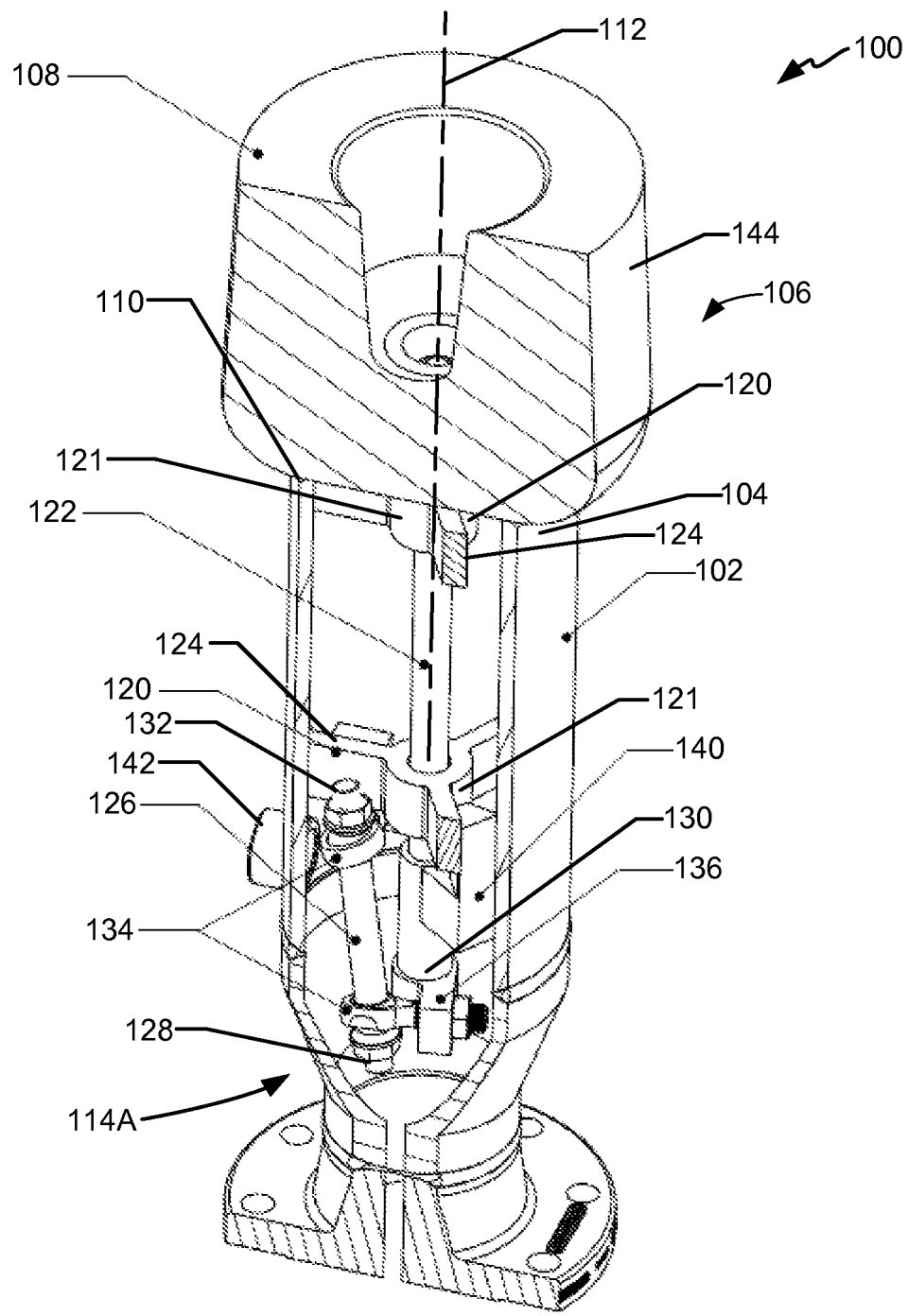
FIGS. 4 and 5 are isometric views of a combustible gas burner with portions shown in cross-section and a pressure relief valve respectively in closed and open modes.
Figure 5:
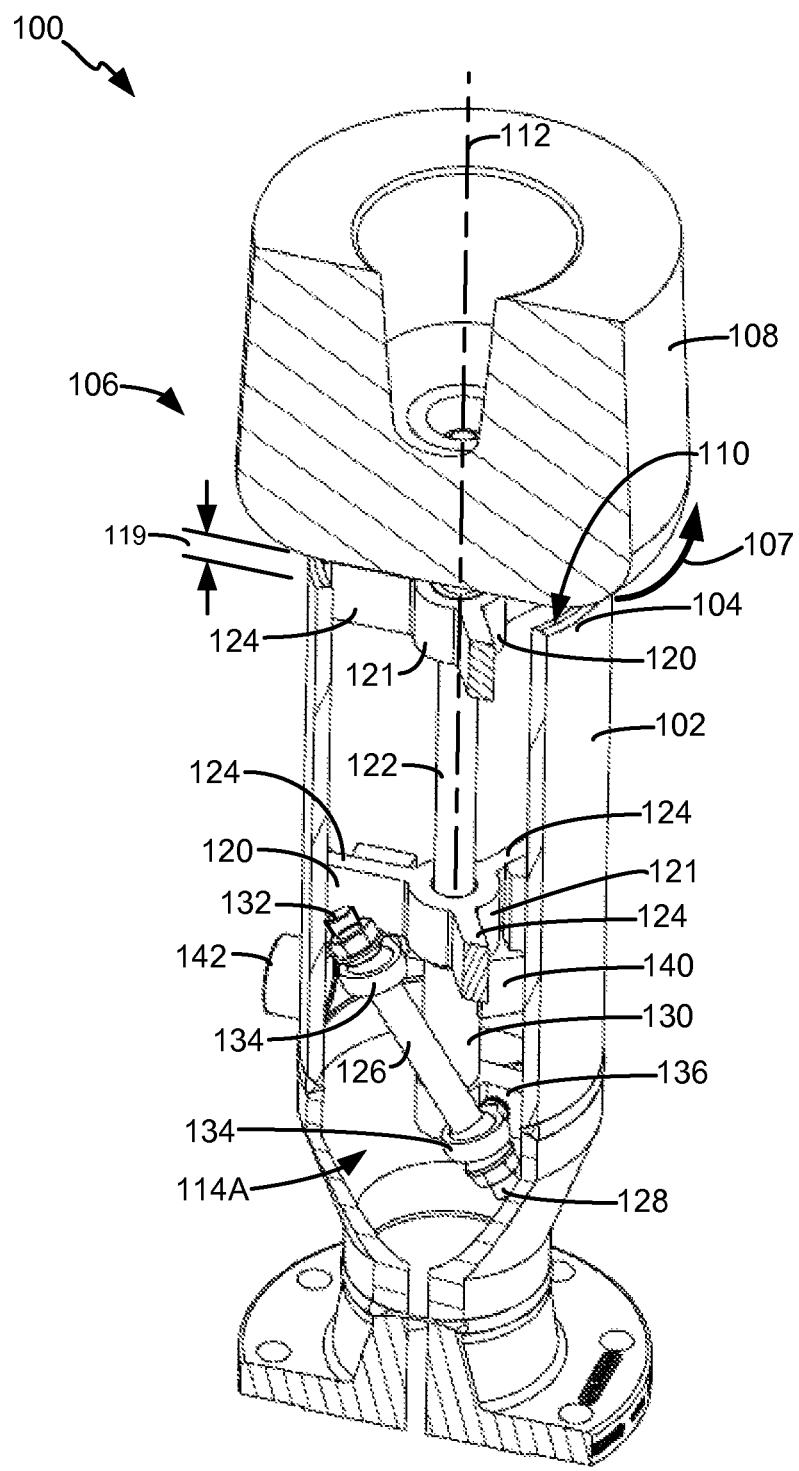
Figure 6:
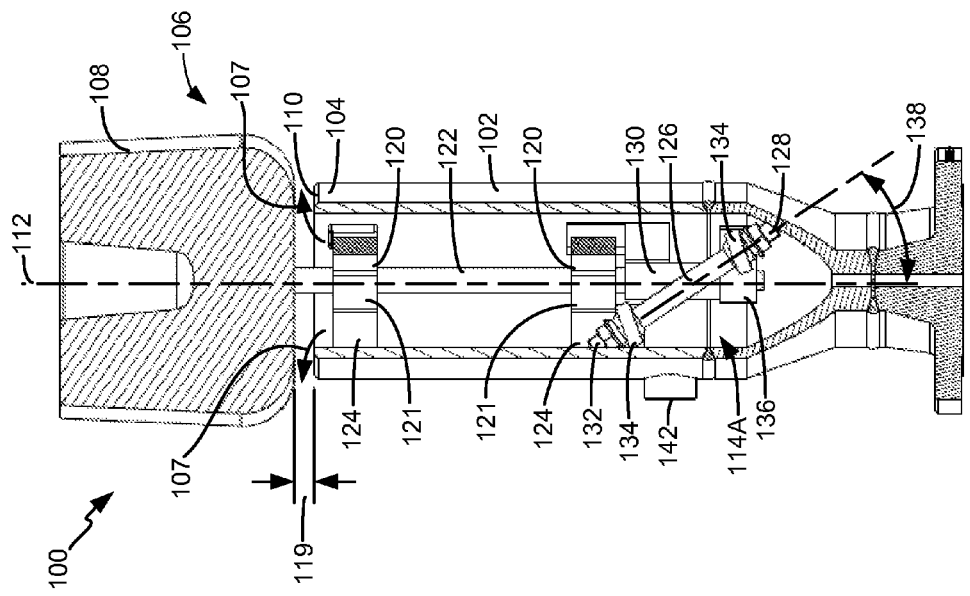
FIGS. 6 and 7 are side cross-sectional views of the burner of FIGS. 4 and 5, respectively.
Figure 7:
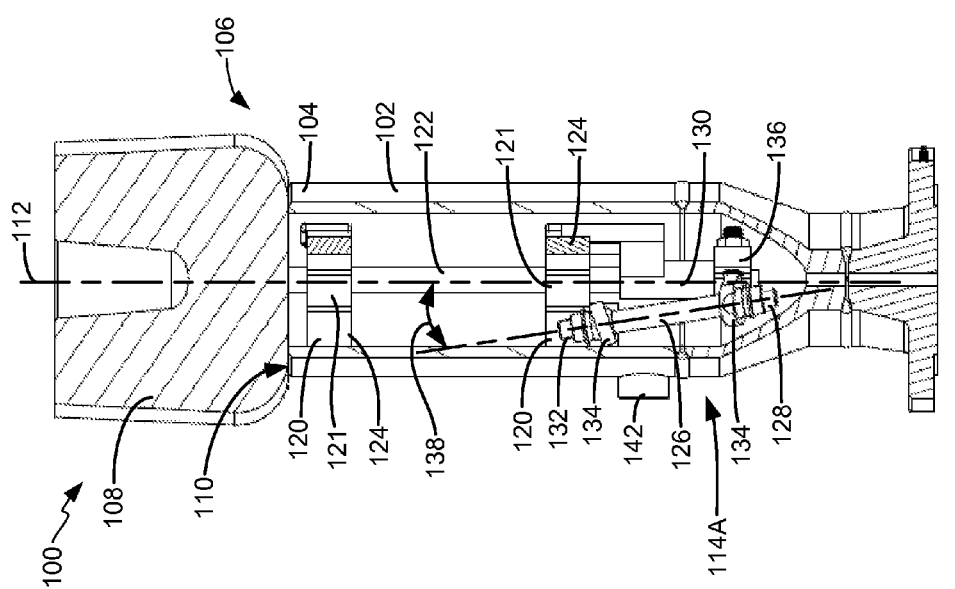
Figure 8:
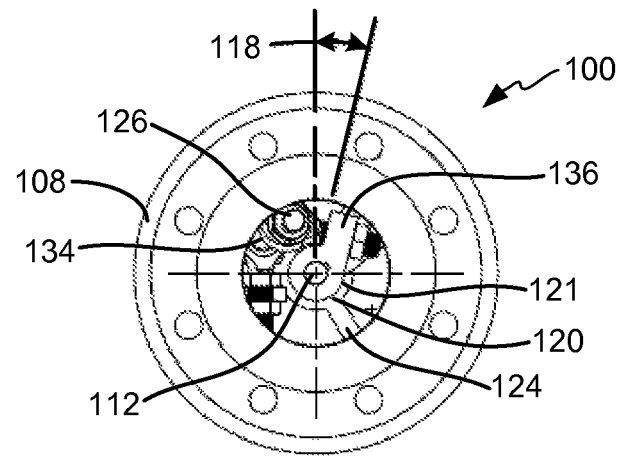
FIGS. 8 and 9 are bottom plan views of the burner of FIGS. 4 and 5, respectively.
Figure 9:
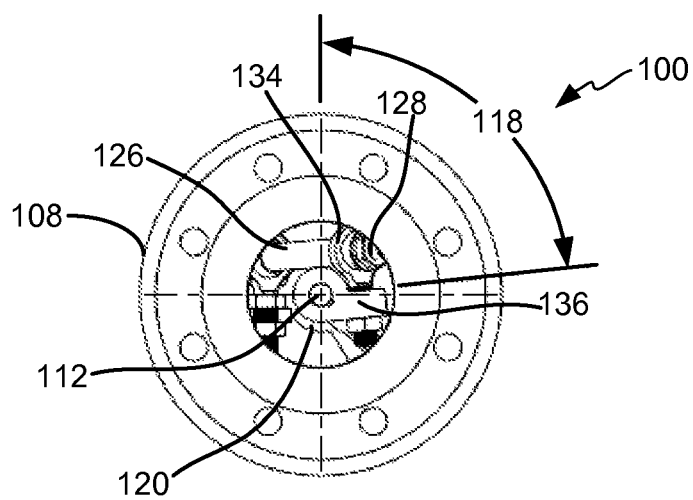

Some exemplary embodiments of the pressure relief valve 106 will be described with reference to FIGS. 4-9. FIGS. 4 and 5 are isometric views of the burner 100 with portions shown in cross-section and the pressure relief valve 106 respectively in closed and open modes. FIGS. 6 and 7 are side cross-sectional views of the burner of FIGS. 4 and 5, respectively. FIGS. 8 and 9 are bottom plan views of the burner of FIGS. 4 and 5, respectively.

The valve body rotator 114 can take on many different forms while providing the desired translation of gas flow pressure against the valve body 108 in the direction of the axis 112 into a rotation of the valve body 108 about the axis 112. In some embodiments, the valve body rotator 114 comprises at least one bushing support 120 attached to the conduit or housing 102. Each of the bushing supports 120 includes a bushing 121 through which a shaft 122, which is attached to the valve body 108, extends. In some embodiments, the shaft 122 is generally coaxial to the axis 112. In some embodiments, the shaft 122 rotates with the rotation of the valve body 108 and moves along the axis 112 with the valve body 108. In some embodiments, the one or more bushing supports 120 include arms 124 or other structure that are attached to the conduit or housing 102. The arms 124 maintain the shaft 122 in coaxial alignment with the axis 112 as the valve body 108 rotates and moves along the axis 112.

Embodiments of the valve body rotator 114 generally include a mechanical linkage having a first end that is attached to the gas flow conduit 102, and a second end that is attached to the valve body 108 either directly or through another component, such as the shaft 122. In some embodiments, the mechanical linkage drives rotation of the valve body 108 about the main axis 112 in response to movement of the valve body 108 along the main axis 112 relative to the valve seat 110.

The burner 100 of FIGS. 4-9 includes a valve body rotator 114A in accordance with exemplary embodiments of the invention. In some exemplary embodiments, the mechanical linkage of the valve body rotator 114A includes a rod 126 having an end 128 coupled to a distal end 130 of the shaft 122, and an end 132 coupled to one of the bushing supports 120 or the conduit 102. In some embodiments, the ends 128 and 132 are each coupled to the respective distal end 130 of the shaft 122 and the conduit 102 or bushing support 120 through a ball joint 134. In some embodiments, the end 128 and the corresponding ball joint 134 is attached to the distal end 130 of the shaft 122 through a bell crank 136.

In some embodiments, the rod 126 is placed at an angle 138 relative to the axis 112, as best shown in FIG. 7. The angle 138 affects the amount the valve body 108 is rotated about the axis 112 in response to movement of the valve body 108 along the axis 112. In some embodiments, the angle 138 increases as the valve body 108 is displaced from the valve seat 110 along the axis 112. In some embodiments, the pressure relief valve 106 includes one or more mechanical stops 140 that limit rotation of the bushing support 120 and/or limit movement of the valve body 108 along the axis 112.

As the end 132 of the rod 126 is fixed relative to the conduit 102, movement of the valve body 108 along the axis 112 relative to the conduit 102 causes an increase in the angle 138 and rotation of the bell crank 136 about the axis 112 to which the end 132 of the rod 126 is attached, as shown in FIGS. 6 and 7. This in turn drives the rotation of the shaft 122 and the valve body 108 about the axis 112. The angle 138 continues to increase as the valve body 108 is displaced further from the valve seat 110, thereby reducing the amount of rotation imparted to the valve body 108 per unit of movement along the axis 112.

In operation, the burner 100 formed in accordance with embodiments described herein receives a flow of combustible gas, such as waste gas, at an inlet 142, which pressurizes the conduit or housing 102. When the pressure within the conduit 102 exceeds the cracking pressure, the valve body 108 is displaced from the valve seat 110 along the axis 112 and a flow of gas 107 is discharged through an opening between the valve body 108 and the valve seat 110, as shown in FIGS. 2, 5 and 7. During this pressure-driven displacement of the valve body 108 from the valve seat 110, the valve body rotator 114A imparts a rotation to the valve body 108. As mentioned above, in some embodiments, the rotation of the valve body 108 per unit length of displacement of the valve body 108 from the valve seat 110 along the axis 112 decreases as the valve body 108 moves further from the valve seat 110. In some embodiments, this reduction in the angular rotation of the valve body 108 is caused by the variable angle 138 formed between the rod 126 and the axis 112, as discussed above.

The variable opening formed between the valve body 108 and the valve seat 110 allows for the gas flow to pass over the valve body 108 and be ignited by a suitable pilot burner 143 (FIGS. 1 and 2), in accordance with conventional burners. In some embodiments, the valve body 108 has a Coanda shape, or other suitable shape.

Figure 10:
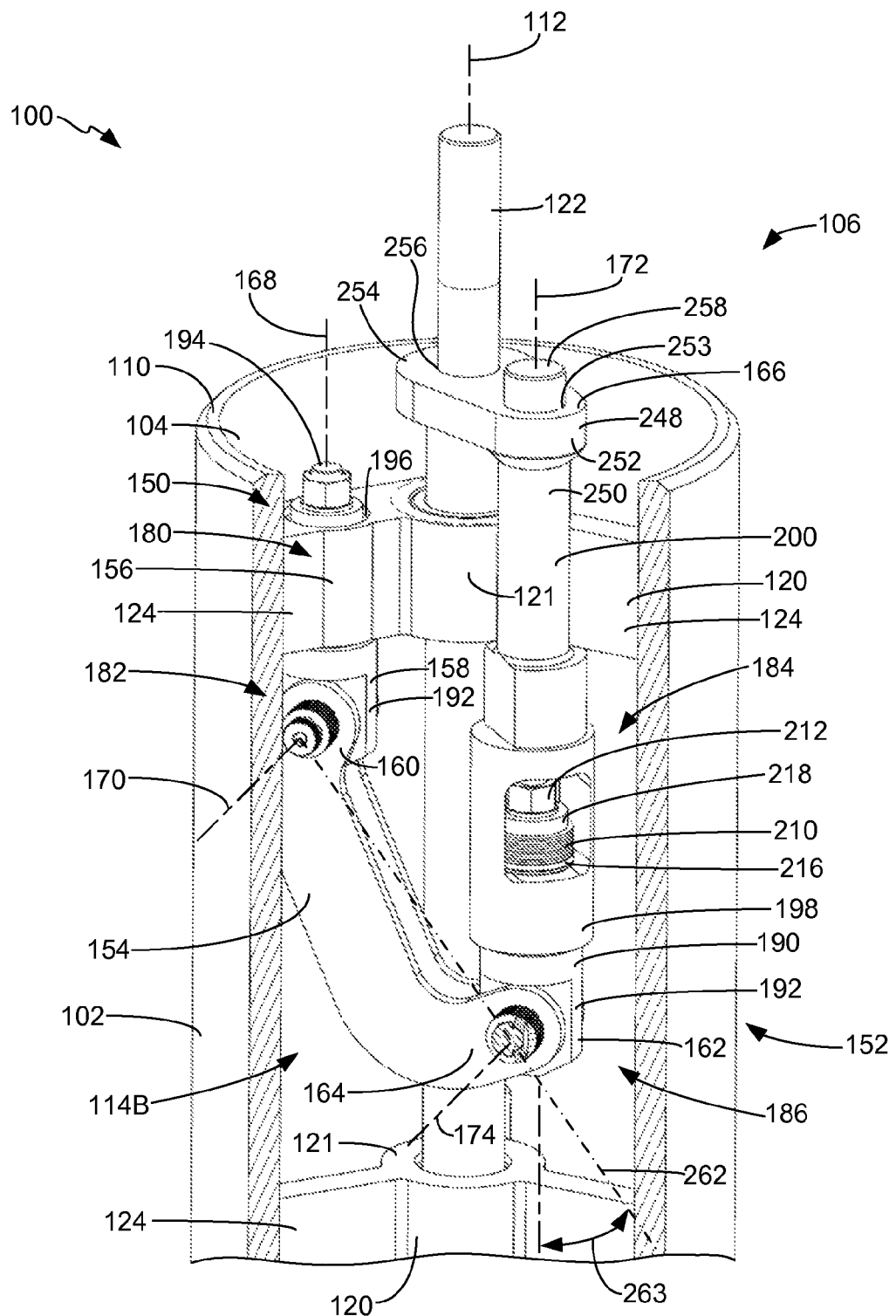
FIG. 10 is an isometric view of a portion of a combustible gas burner with a portion of a housing or conduit and a valve body removed, in accordance with embodiments of the invention.
Figure 11:
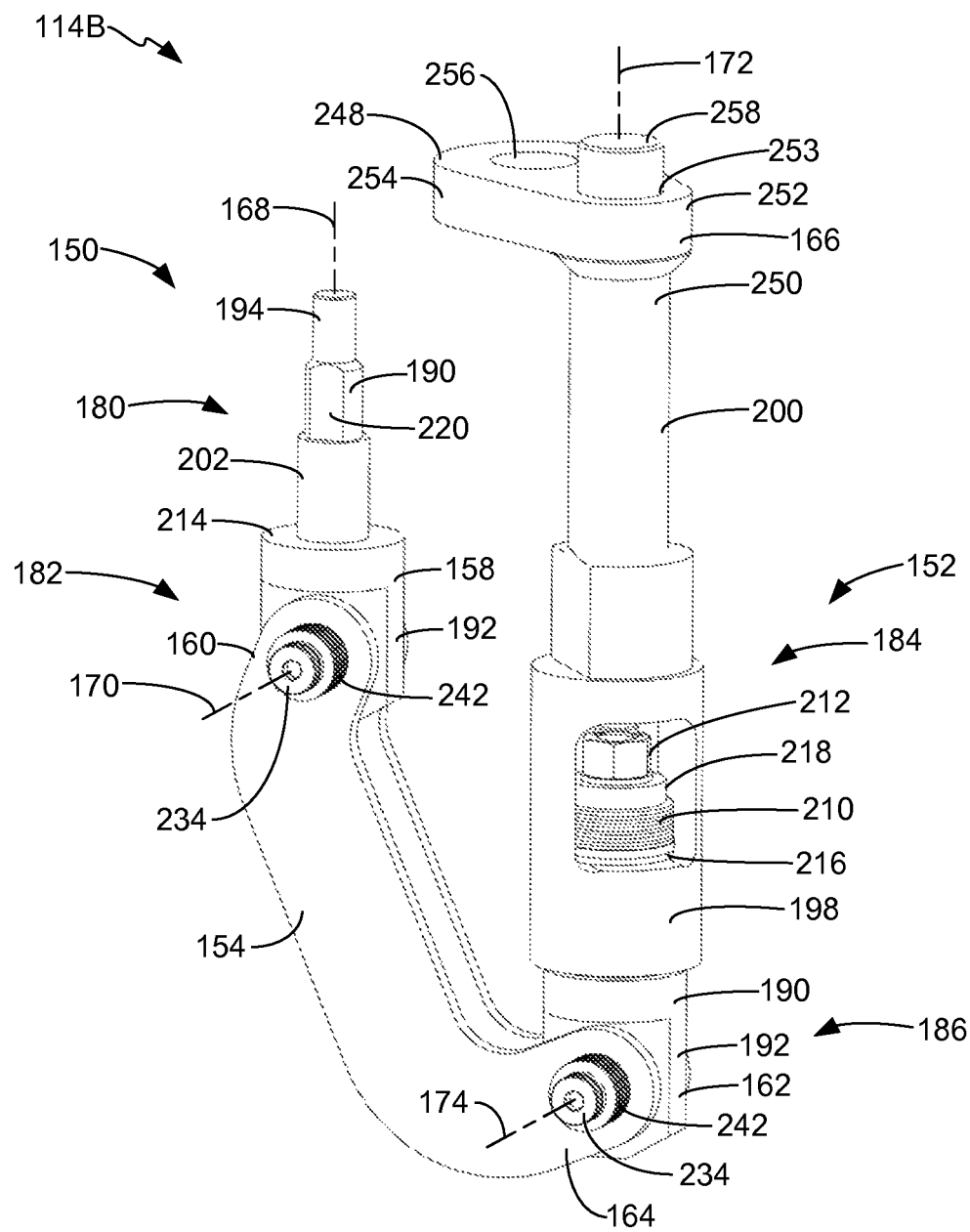
FIG. 11 is an isometric view of a valve body rotator in accordance with embodiments of the invention.
Figure 12:
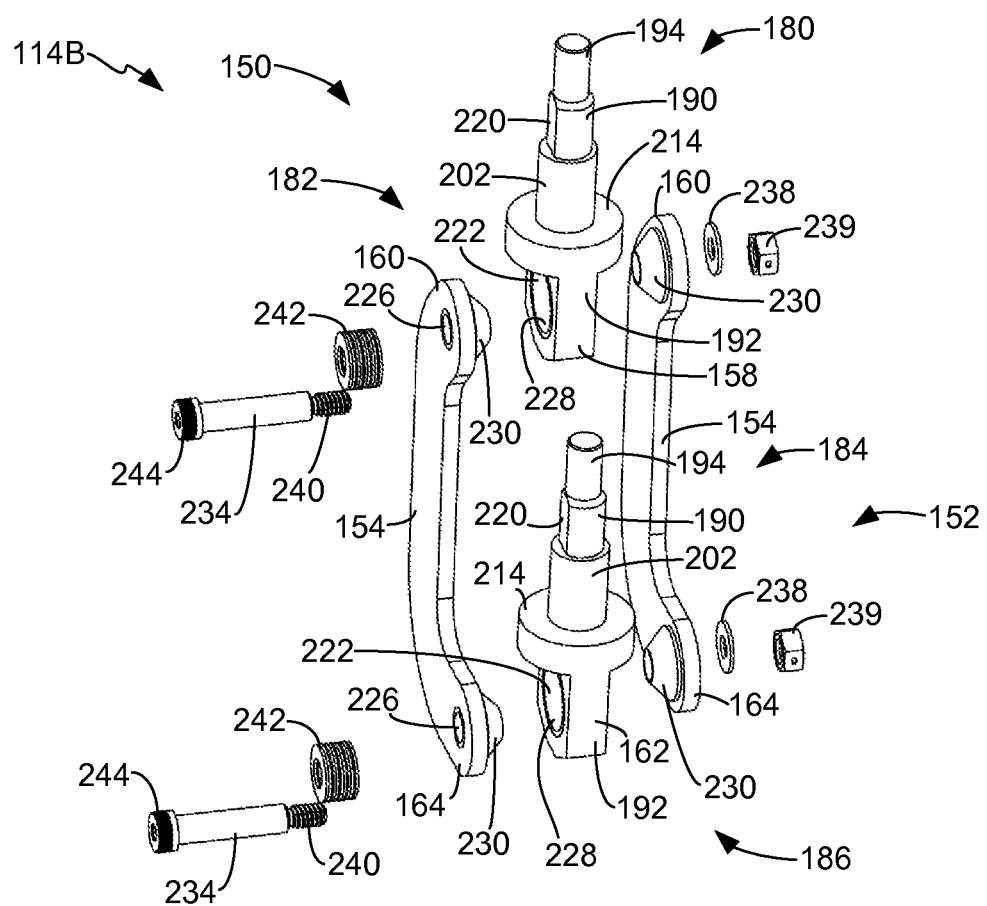
FIG. 12 is an exploded isometric view of a portion of the valve body rotator of FIG. 10 in accordance with embodiments of the invention.
Figure 13:
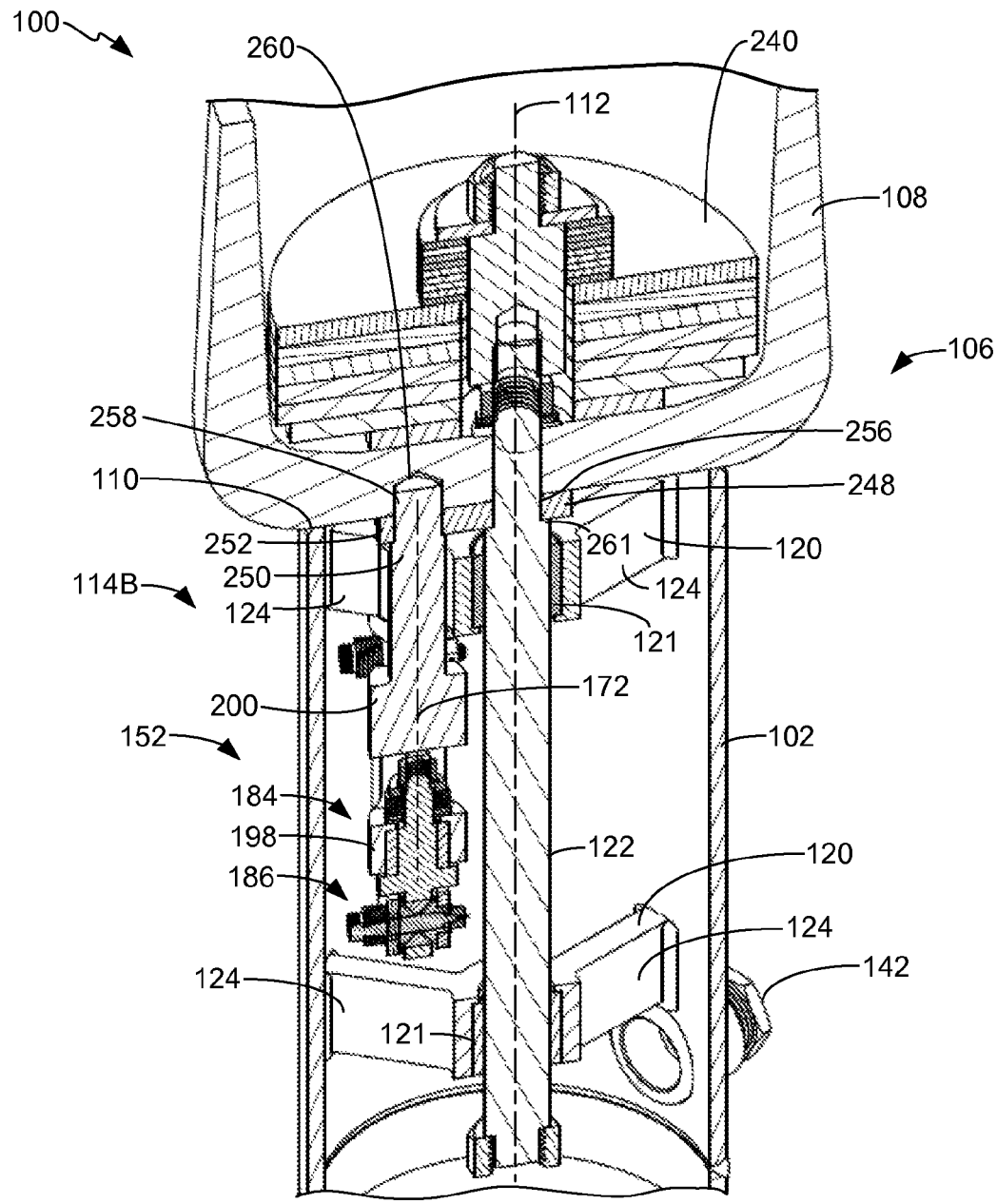
FIG. 13 is a front cross-sectional view of the burner of FIG. 10 in accordance with embodiments of the invention.
Figure 14:
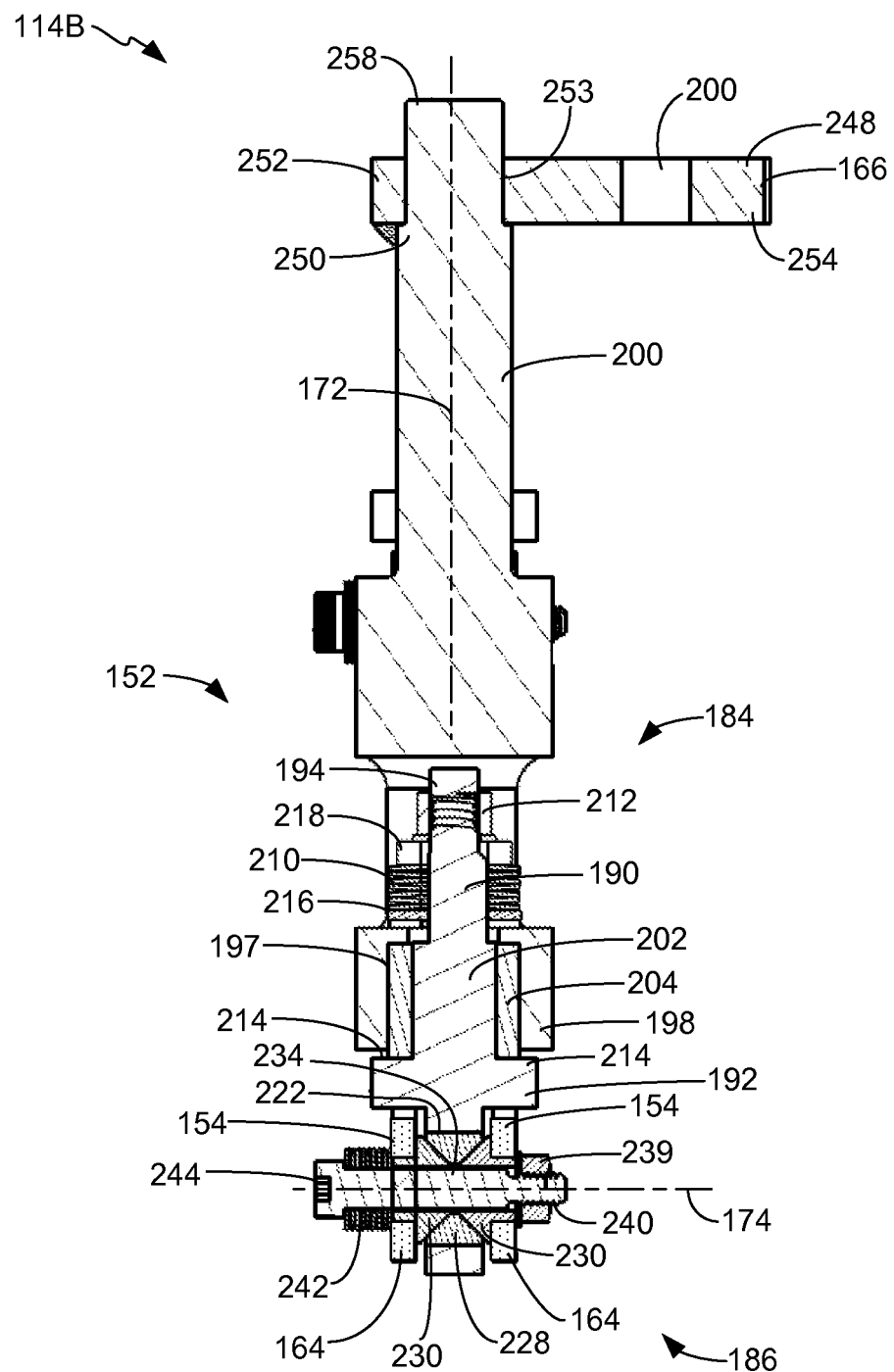
FIG. 14 is a front cross-sectional view of a valve body rotator of FIG. 14 in accordance with embodiments of the invention.

FIGS. 10-14 illustrate an exemplary valve body rotator 114B in accordance with embodiments of the invention. Elements that are identified by reference numbers that are the same or similar to those described above represent the same or similar elements. FIG. 10 is an isometric view of a portion of the burner 100 with a portion of the housing 102 and the valve body 108 removed to expose the valve body rotator 114B. FIG. 11 is an isometric view of the valve body rotator 114B of FIG. 10 in accordance with embodiments of the invention. FIG. 12 is an exploded isometric view of a portion of the valve body rotator 114B of FIG. 10. FIG. 13 is a front cross-sectional view of the burner 100 of FIG. 10 in accordance with embodiments of the invention. FIG. 14 is a cross-sectional view of the valve body rotator 114B of FIG. 13 in accordance with embodiments of the invention.

Embodiments of the valve body rotator 114B include a mechanical linkage having a first end that is attached to the gas flow conduit 102, such as through a bushing support 120, and a second end that is attached to the valve body 108 either directly or through another component, such as the shaft 122. In some embodiments, the mechanical linkage includes a first mechanical joint 150, a second mechanical joint 152, and a rod (e.g., a forked rod) or linkage arm 154, as shown in FIGS. 10 and 11.

In some embodiments, the first mechanical joint 150 has an end 156, which has a fixed position relative to the gas flow conduit or housing 102, as shown in FIG. 10. In some embodiments, the end 156 is attached to one of the bushing supports 120, attached directly to the conduit or housing 102, or attached to another component that has a fixed position relative to the conduit 102, for example. In some embodiments, the mechanical joint 150 has a second end 158 that is attached to an end 160 of the arm 154.

In some embodiments, the mechanical joint 152 has an end 162 that is attached to an end 164 of the arm 154, and an end 166, which has a fixed position relative to the valve body 108, as shown in FIG. 10. The end 166 of the mechanical joint 152 may be directly attached to the valve body 108, or attached to the valve body 108 through one or more intermediary components.

In some embodiments, the mechanical joint 150 facilitates rotation of the end 160 of the arm 154 about axes 168 and 170, which are transverse to each other, as shown in FIGS. 10 and 11. In some embodiments, the axes 168 and 170 are perpendicular to each other. In some embodiments, the axis 168 is parallel to the axis 112. In some embodiments, the axis 170 is perpendicular to the axis 112.

In some embodiments, the mechanical joint 152 facilitates rotation of the end 164 of the arm 154 about axes 172 and 174, which are transverse to each other, as shown in FIGS. 10 and 11. In some embodiments, the axes 172 and 174 are perpendicular to each other. In some embodiments, the axis 172 is parallel to the axis 112. In some embodiments, the axis 174 is perpendicular to the axis 112.

In some embodiments, the mechanical joint 150 of the valve body rotator 114B includes a hinge joint 180 and a knuckle joint 182. In some embodiments, the mechanical joint 152 includes a hinge joint 184 and a knuckle joint 186. In some embodiments, the knuckle joint 182 is connected to the knuckle joint 186 through the one or more rods or linkage arms 154.

In some embodiments, the hinge joints 180 and 184 are formed similarly to each other. In some embodiments, each of the joints 180 and 184 includes a member 190 that is attached to or formed integral with a member 192 of the corresponding knuckle joint 182 or 186, as shown in FIGS. 11 and 12. In some embodiments, a distal end 194 of the member 190 of the hinge joint 180 extends through a bore 196 formed in an arm 124 of one of the bushing supports 120, as shown in FIG. 10. It is understood that the bore 196 could be formed in another component that is attached to the housing or conduit 102. Similarly, in some embodiments, the distal end 194 of the member 190 of the hinge joint 184 extends through a bore 197 of a proximal end 198 of a post 200 of the valve body rotator 114B, as shown in FIG. 14.

In some embodiments, each of the members 190 includes a cylindrical portion 202, as shown in FIG. 12. The cylindrical portion 202 of the hinge joint 180 is received within the bore 196, and the cylindrical portion 202 of the hinge joint 184 is received within the bore 197 of the post 200 (FIG. 14). In some embodiments, a bushing 204 is received within the bore 197 of the post 200 and engages the cylindrical portion 202, as shown in FIG. 14. In some embodiments, the bushing 204 is formed of a low friction material, such as graphalloy. In some embodiments, the cylindrical portion 202 of the hinge joint 180 engages a bushing that is received in the bore 196, in a similar manner to that of the hinge joint 184. In some embodiments, the member 190 of the hinge joint 180 is configured to rotate within the bore 196 about the axis 168 (FIG. 10), and the member 190 of the hinge joint 184 is configured to rotate within the bore 197 of the post 200 about the axis 172 (FIGS. 11 and 14).

Each of the members 190 of the hinge joints 180 and 184 are secured within their corresponding bores 196 and 197 for rotation about the corresponding axis 168 or 172 using any suitable technique. Exemplary techniques in accordance with embodiments of the invention will be described with reference to the hinge joint 184. In some embodiments, a spring member 210 is compressed between the proximal end 198 of the post 200 and a nut 212 that is screwed on threads of the distal end 194 of the member 190, as shown in FIG. 14. The spring member 210 applies a continuous force to the member 190 along the axis 172 to maintain a shoulder portion 214 of the member 190 or 192 in contact with the bushing 204. In some embodiments, the spring member 210 may be in the form of a disc spring or a coned-disc spring, such as a Belleville washer, or other suitable spring member.

In some embodiments, the spring member 210 is sandwiched between a washer 216 and a washer 218. In some embodiments, the member 190 includes a portion 220 having a non-circular cross-section, such as a D-shaped cross-section (FIG. 12), and the washer 216 has a corresponding conforming hole through which the portion 220 extends. This causes the washer 216 to rotate about the axis 172 with rotation of the member 190.

In some embodiments, the knuckle joints 182 and 186 are each formed in a similar manner. In some embodiments, the member 192 of each knuckle joint 182 and 186 includes a bore 222, as shown in FIG. 12. In some embodiments, ends 160 of the arms 154 are positioned on opposing sides of the member 192 of the knuckle joint 182, and ends 164 of the arms 154 are positioned on opposing sides of the member 192 of the knuckle joint 186, as shown in FIG. 11. The ends 160 and 164 each include an aperture 226 (FIG. 12). In some embodiments, a tapered bushing 228 is received within the bore 222 of each member 192, as illustrated by the cross-sectional view of the knuckle joint 186 shown in FIG. 14. In some embodiments, the tapered bushing 228 is a tapered graphalloy bushing. In some embodiments, each of the knuckle joints 182 and 186 include a pair of tapered buttons 230 that engage the tapered bushing 228, as shown in FIG. 14. In some embodiments, the tapered buttons 230 are formed of graphalloy or other suitable material. In some embodiments, a member 234 extends through the bores 226 of the arms 154 and bores of the tapered bushing 228 and the tapered buttons 230, as shown in FIG. 14.

The member 234 is secured to the arms 154 using any suitable technique to allow the knuckle joint 182 to pivot about the axis 170 of its bore 222, and the knuckle joint 186 to pivot about the axis 174 of its bore 222. In some embodiments, the member 234 is secured to the arms 154 using a washer 238 and a nut 239 that is attached to a threaded end 240 of the member 234, as shown in FIG. 12. In some embodiments, each of the knuckle joints 182 and 186 include a spring member 242 that is compressed between an end 244 of the member 234 and one of the arms 154, as shown in FIG. 14. The compression of the spring member 242 pinches the tapered buttons 230 against the tapered bushing 228 and prevents the formation of slop in the knuckle joints 182 and 186.

In some embodiments, the valve body rotator 114B includes a crank arm 248 that is attached to a distal end 250 of the post 200, as shown in FIGS. 10, 11 and 14. In some embodiments, an end 252 of the crank arm 248 is welded to the post 200 or attached to the post 200 in another suitable manner. In some embodiments, the distal end 250 of the post 200 extends through a bore 253 in the end 252 of the crank arm 248, as shown in FIG. 14. In some embodiments, an end 254 of the crank arm 248 includes a bore 256 through which the shaft 122 extends, as shown in FIGS. 10 and 13.

In some embodiments, the distal end 250 of the post 200 includes a projection 258 that extends along the axis 172 above the crank arm 248, as shown in FIGS. 10 and 11. In some embodiments, the valve body 108 is attached to the shaft 122 and includes a receptacle 260 that receives the projection 258, as shown in FIG. 13. In some embodiments, the post 200 is secured within the receptacle 260 by the attachment of the valve body 108 to the shaft 122. In some embodiments, the attachment of the valve body 108 to the shaft 122 pinches the crank arm 248 between the valve body 108 and a shoulder 261 of the shaft 122 (FIG. 13), and causes the crank arm 248 to rotate with rotation of the valve body 108 and the shaft 122 about the axis 112.

In operation, the burner 100 that includes the valve body rotator 114B receives a flow of combustible gas, such as waste gas, at an inlet 142 (FIG. 13), which pressurizes the conduit or housing 102. In some embodiments, when the pressure within the conduit 102 is below a cracking or threshold pressure, the valve body engages the valve seat 110. Such engagement may or may not seal the opening 104.

When the pressure within the conduit 102 exceeds the cracking or threshold pressure, the valve body 108 is displace from the valve seat 110 along the axis 112, and a flow of gas 107 is discharged through an opening between the valve body 108 and the valve seat 110, as generally discussed above with reference to FIGS. 2, 5 and 7. During this pressure-driven displacement of the valve body 108 from the valve seat 110, the valve body rotator 114B imparts a rotation to the valve body 108 about the axis 112.

Movement of the valve body 108 and the attached shaft 122 along the axis 112 drives movement of the crank arm 248 along the axis 112 due to its attachment to the valve body 108 and the shaft 122. The post 200 also moves along the axis 172 with the movement of the crank arm 248 and the valve body 108. The mechanical linkage of the valve body rotator 114B rotates the valve body 108 in response to this vertical movement of the post 200 in the direction of the axis 112 or the axis 172. The variable opening formed between the valve body 108 and the valve seat 110 allows for the gas flow to pass over the valve body 108 and be ignited by a suitable pilot burner 143 (FIGS. 1 and 2).

In some embodiments, as the valve body 108 moves along the axis 112 relative to the valve seat 110, the ends 160 of the arms 154 rotate about the axis 168 of the hinge joint 180, and the ends 164 of the arms 154 rotate about the axis 172 of the hinge joint 184. Additionally, the ends 160 rotate about the axis 170 of the knuckle joint 182, and the ends 194 of the arms 154 rotate about the axis 174 of the knuckle joint 186. These movements drive the post 200 and its projection 258 angularly about the axis 112, which drives rotation of the valve body 108 about the axis 112. The valve body 108 is rotated in one direction as the valve body 108 moves along the axis 112 away from the valve seat 110, and the valve body is moved in the opposite direction as the valve body 108 moves along the axis 112 toward the valve seat 110.

In some embodiments, the one or more linkage arms 154 generally extend along a line 262 that passes through the axes 170 and 174, as shown in FIG. 10. The arms 154 are oriented at an angle 263 relative to the axis 112. The angle 263 affects the amount the valve body 108 is rotated about the axis 112 per unit of movement of the valve body 108 along the axis 112 relative to the valve seat 110. In some embodiments, the angle 263 increases as the valve body 108 is displaced along the axis 112 away from the valve seat 110, and the angle 263 decreases as the valve body 108 moves toward the valve seat along the axis 112. In some embodiments, the smaller the angle 263, the greater the amount of rotation that is imparted to the valve body 108 by the valve body rotator 114B. Thus, the further the valve body 108 is displaced from the valve seat 110, the less the valve body rotator 114B rotates the valve body 108 in response to a unit of movement of the valve body 108 along the axis 112.

The movement of the valve body 108 along the axis 112 provides a substantially constant pressure for the gas flow 107 while accommodating for a wide range of volumetric gas flow rates. The cracking pressure for the valve body 108 may be determined by the mass of valve body 108. As a result, the velocity of the exiting gas flow 107 through the opening between the valve body 108 and the valve seat 110 may be tuned based on the mass of the valve body 108 and the diameter of the outlet 104 of the conduit 102. In some embodiments, the mass of the valve body 108 may be customized by pouring concrete within a cavity formed by walls 144 (FIG. 4) of the valve body 108, by adding plates 240 to the valve body 108 (FIG. 13), or through another suitable technique.

In some embodiments, the moment of inertia of the valve body 108 about the axis 112 is maximized by radially displacing the material of the valve body away from the axis 112. The central portion of the valve body 108 near the axis 112 may be removed to increase the moment of inertia of the valve body 108, as shown in FIG. 4.

It is understood that the valve body rotators 114A (FIGS. 4-9) and 114B (FIGS. 10-14) are merely examples of many forms that the valve body rotator 114 can have. Additional exemplary embodiments of the valve body rotator 114 include a screw-like design, in which a component attached to the shaft 122 is forced to follow a guide surface that drives rotation of the valve body 108 about the axis 112 as the valve body 108 moves along the axis 112. This may take the form of a screw and thread arrangement between the shaft 122 and the conduit 102. For instance, the shaft 122 may comprise a lead screw, which is received within a threaded bore having a fixed location relative to the conduit 102. As the valve body 108 moves along the axis 112, the lead screw is forced to rotate due to the engagement with the threaded bore. Other arrangements are also possible to form the desired valve body rotator 114.

It is understood by those skilled in the art that the pressure relief valve 106 formed in accordance with one or more embodiments described herein may also be applied to applications other than burners. Accordingly, some embodiments of the invention are directed to one or more embodiments of the pressure relief valve 106 alone and in combination with gas flow conduit or a housing 102. Thus, some embodiments of the invention are directed to a pressure relief valve or gas flow regulator 106 comprising the valve body 108 and the valve body rotator 114 in accordance with one or more embodiments described herein. The pressure relief valve 106 may be installed in any suitable conduit or housing 102 to provide pressure relief when the pressure within the conduit or housing 102 exceeds a cracking pressure of the valve 106.

Thus, some embodiments of the invention are directed to a pressure relief valve 106 comprising a valve body 108 configured to engage a valve seat 110 and move along an axis 112 relative to the valve seat 110 in response to a pressure within a conduit or housing 102, to which the pressure relief valve 106 is mounted or installed. The valve body rotator 114 (e.g., valve body rotator 114A or 114B) is configured to rotate the valve body 108 about the axis 112 in response to movement of the valve body 108 along the axis 112 relative to the valve seat 110. Embodiments described above with regard to the valve body 108 and the valve body rotator 114 may also be applied to this embodiment of the pressure relief valve 106.

Figure 15:
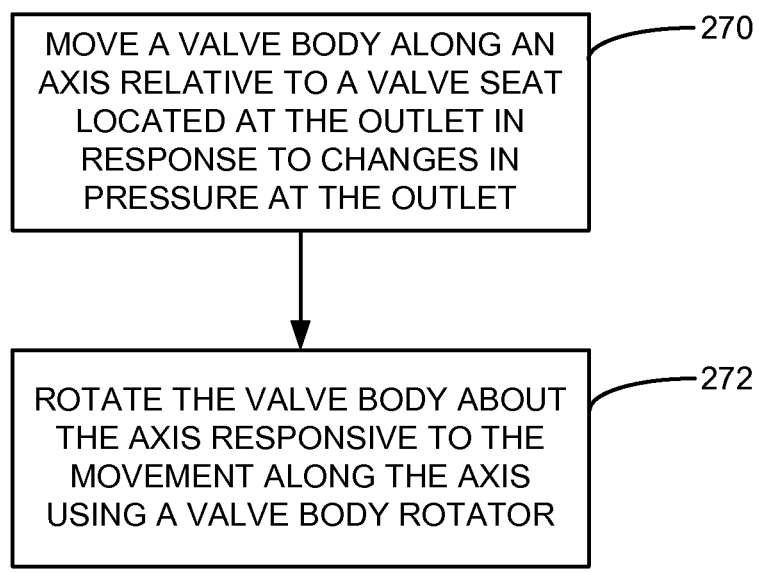
FIG. 15 is a flowchart illustrating a method of regulating a flow of combustible gas through an outlet of conduit of a burner, in accordance with embodiments of the invention.

Some embodiments of the invention are directed to a method of regulating a flow of gas through conduit 102 using the pressure relief valve 106 in accordance with one or more embodiments described herein. FIG. 15 is a flowchart illustrating a method of regulating a flow of a combustible gas through an outlet 110 of conduit 102 of a burner in accordance with embodiments of the invention.

At 270 of the method, a valve body 108 is moved along an axis 112 relative to a valve seat 110 located at the outlet 104 in response to changes in pressure or the gas flow at the outlet. At 272, the valve body 108 is rotated about the axis 112 responsive to the movement of the valve body 108 along the axis 112 using a valve body rotator 114, such as valve body rotator 114A or 114B formed in accordance with one or more embodiments described above.

In some embodiments of the method, the valve body 108 engages the valve seat 110, or is positioned in close proximity to the valve seat 110, when the pressure at the outlet 104 is below a threshold or cracking pressure. In some embodiments, the valve body 108 is displaced along the axis 112 from the valve seat 110 when the pressure at the outlet 104 is above the threshold or cracking pressure.

In some embodiments of the method, combustible gas 107 is discharged through the outlet 104 at a substantially constant velocity when the valve body 108 is displaced from the valve seat 110 and the pressure at the outlet is above the threshold pressure, as shown in FIG. 2. In some embodiments of the method, the combustible gas 107 is discharged through an opening formed between the valve body 108 and the valve seat 110 at the outlet 104, and is ignited using a pilot burner 143.

In some embodiments of the method, an amount of rotation of the valve body 108 per unit length of movement of the valve body 108 along the axis 112 relative to the valve seat 110 is based on a distance 119 the valve body 108 is displaced from the valve seat 110, using the valve body rotator 114.

In some embodiments of the method, the burner 100 comprises a shaft 122 attached to the valve body 108, one or more bushing supports 120 each having a fixed position relative to the conduit or housing 102, and one or more bushings 121, through which the shaft 122 extends. In some embodiments, each bushing 121 is supported by one of the bushing supports 120 and is configured to maintain the shaft 122 in general coaxial alignment with the axis 112.

In some embodiments, the valve body rotator 114 comprises a rod 126 having a first end 128 coupled to the shaft 122 and a second end 132 coupled to one of the bushing supports 120 or the conduit or housing 102. In some embodiments, the rotating step 272 comprises driving rotation of the valve body 108 and the shaft 122 about the axis 112 using the rod 126 responsive to the moving step 270. In some embodiments, the rod 126 is placed at an angle 138 (FIG. 7) relative to the axis 112. In some embodiments, the method comprises changing the angle 138 responsive to the moving step 270. Similarly, the valve body rotator 114 may be formed in accordance with one or more embodiments of the valve body rotator 114B, and the angle 263 changes in response to the moving step 270, as described above.

Although the present invention has been described with reference to preferred embodiments, workers skilled in the art will recognize that changes may be made in form and detail without departing from the spirit and scope of the invention.

What is claimed is:

1. A combustible gas burner comprising:
   gas flow conduit including an outlet; and
   a pressure relief valve comprising:
      a valve seat at the outlet;
      a valve body configured to engage the valve seat and move along a main axis relative to the valve seat in response to a pressure at the outlet; and
      a valve body rotator configured to rotate the valve body about the main axis in response to movement of the valve body along the main axis relative to the valve seat.

2. The burner according to claim 1, wherein the valve body rotator comprises a mechanical linkage having a first end attached to the gas flow conduit, and a second end attached to the valve body, wherein the mechanical linkage drives rotation of the valve body about the main axis in response to movement of the valve body along the main axis relative to the valve seat.

3. The burner according to claim 2, wherein:
   the valve body rotator includes a crank arm configured to rotate about the main axis, the crank arm including a distal end that is radially displaced from the main axis; and
   the second end of the mechanical linkage is attached to the distal end of the crank arm.

4. The burner according to claim 3, wherein the crank arm moves along the main axis relative to the valve seat with movement of the valve body along the main axis.

5. The burner according to claim 2, wherein the mechanical linkage comprises:
   a linkage arm having first and second ends;
   a first mechanical joint comprising a first end having a fixed position relative to the gas flow conduit, and a second end that is attached to the first end of the linkage arm;
   a second mechanical joint comprising a first end that is attached to the second end of the linkage arm, and a second end that is attached to the valve body;
   wherein:
      the first mechanical joint facilitates rotation of the first end of the linkage arm about first and second axes, which are transverse to each other; and
      the second mechanical joint facilitates rotation of the second end of the linkage arm about third and fourth axes, which are transverse to each other.

6. The burner according to claim 5, wherein the first mechanical joint comprises:
   a first hinge joint comprising a first hinge member that is configured to rotate about the first axis; and
   a first knuckle joint comprising a first knuckle member that is attached to the first hinge member and defines the second axis;
   wherein the first end of the linkage arm is attached to the first hinge member and the first knuckle member.

7. The burner according to claim 6, wherein the second mechanical joint comprises:
   a second hinge joint comprising a second hinge member that is configured to rotate about the third axis; and
   a second knuckle joint comprising a second knuckle member that is attached to the second hinge member and defines the fourth axis;
   wherein the second end of the linkage arm is attached to the second hinge member and the second knuckle member.

8. The burner according to claim 7, wherein the second hinge joint comprises a post that is attached to the valve body, wherein the second hinge member is configured to rotate about the third axis relative to the post.

9. The burner according to claim 7, wherein the first axis and the third axis are substantially parallel to the main axis.

10. The burner according to claim 9, wherein the second axis and the fourth axis are substantially perpendicular to the main axis.

11. The burner according to claim 6, wherein:
   the first mechanical joint includes a first tapered bushing within a bore of the first hinge member, and a first pair of tapered buttons that engage the first tapered bushing; and
   the first knuckle member extends through the bore of the first hinge member, the first tapered bushing and the first pair of tapered buttons.

12. The burner according to claim 11, wherein the first pair of tapered buttons are pressed against the first tapered bushing using a first spring member.

13. The burner according to claim 7, wherein:
the second mechanical joint includes a second tapered bushing within a bore of the second hinge member, and a second pair of tapered buttons that engage the second tapered bushing; and
the second knuckle member extends through the bore of the second hinge member, the second tapered bushing and the second pair of tapered buttons.

14. The burner according to claim 13, wherein the second pair of tapered buttons are pressed against the second tapered bushing using a second spring member.

15. The burner according to claim 7, wherein:
the first hinge joint includes a third hinge member, which has a fixed position relative to the gas flow conduit, and the first hinge member includes a cylindrical portion that extends through a bore of the third hinge member; and
the second hinge joint includes a fourth hinge member, which has a fixed position relative to the valve body, and the second hinge member includes a cylindrical portion that extends through a bore of the fourth hinge member.

16. The burner according to claim 15, wherein:
the first hinge joint comprises:
a bushing extending within the bore of the third hinge member; and
a spring member that drives a shoulder of the first hinge member against the bushing extending within the bore of the third hinge member; and
the second hinge joint comprises:
a bushing extending within the bore of the fourth hinge member; and
a spring member that drives a shoulder of the second hinge member against the bushing extending within the bore of the fourth hinge member.

17. The burner according to claim 15, wherein the burner comprises:
a shaft attached to the valve body;
one or more bushing supports, each having a fixed position relative to the gas flow conduit; and
one or more shaft bushings through which the shaft extends, each shaft bushing supported by one of the bushing supports and configured to maintain the shaft in general alignment with the main axis.

18. The burner according to claim 17, wherein:
the valve body rotator is configured to decrease the amount of rotation of the valve body per unit length of movement of the valve body along the main axis relative to the valve seat as the distance the valve body is displaced from the valve seat increases; and
the valve body rotator is configured to increase the amount of rotation of the valve body per unit length of movement of the valve body along the main axis relative to the valve seat as the distance the valve body is displaced from the valve seat decreases.

19. The burner according to claim 7, further comprising a pilot burner configured to ignite the combustible gas discharged through the outlet.

20. A method of regulating a flow of combustible gas through an outlet of conduit or a housing of a burner comprising steps of:
moving a valve body along an axis relative to a valve seat located at the outlet in response to changes in pressure at the outlet; and
rotating the valve body about the axis responsive to the moving step using a valve body rotator.

* * * * *